US012654336B1

(12) United States Patent
Kersholt

(10) Patent No.: US 12,654,336 B1
(45) Date of Patent: Jun. 16, 2026

(54) END OF ARM TOOLS HAVING BELT-DRIVEN ENGAGEMENT MEMBERS

(71) Applicant: Amazon Technologies, Inc., Seattle, WA (US)

(72) Inventor: Vincent Kersholt, Melrose, MA (US)

(73) Assignee: Amazon Technologies, Inc., Seattle, WA (US)

( * ) Notice: Subject to any disclaimer, the term of this patent is extended or adjusted under 35 U.S.C. 154(b) by 291 days.

(21) Appl. No.: 18/467,082

(22) Filed: Sep. 14, 2023

(51) Int. Cl.
*B25J 9/00* (2006.01)
*B25J 15/06* (2006.01)

(52) U.S. Cl.
CPC ......... *B25J 15/0683* (2013.01); *B25J 9/0009* (2013.01)

(58) Field of Classification Search
CPC ............................ B25J 15/0683; B25J 9/0009
See application file for complete search history.

(56) References Cited

U.S. PATENT DOCUMENTS 9,974,667 B1 * 5/2018 Cazenave ............... A61F 2/586
10,059,007 B1 8/2018 O'Connor 10,464,217 B1 * 11/2019 Phan ........................ B25J 15/10
10,858,188 B2 * 12/2020 Fujihara ............... B25J 15/0061
11,207,786 B1 * 12/2021 Polido .................. B25J 15/0052
2017/0203443 A1 7/2017 Lessing
2019/0039838 A1 2/2019 Curhan
2019/0084762 A1 3/2019 Fujihara
2022/0118629 A1 * 4/2022 Payton ..................... B25J 15/10
2022/0203554 A1 6/2022 Abe

OTHER PUBLICATIONS

YouTube, "SRI Robotics: BACH-Belt-Augmented Compliant Hand" https://www.youtube.com/watch?v=6rN8_cFjrY, Accessed Sep. 14, 2023, 1 page.

* cited by examiner

*Primary Examiner* — Gerald McClain
(74) *Attorney, Agent, or Firm* — Eversheds Sutherland (US) LLP

(57) ABSTRACT

Systems and methods for end of arm tools having belt-driven engagement members and related item manipulation devices are provided. In one embodiment, an example item manipulation device may include a housing, a suction cup assembly having a first suction cup, where the suction cup assembly is positioned at a distal end of the housing, a first engagement member having a first arm portion configured to rotate with respect to the housing, a first belt coupled to the first arm portion, and a first actuator configured to actuate the first belt to cause the first arm portion to rotate with respect to the housing.

19 Claims, 11 Drawing Sheets

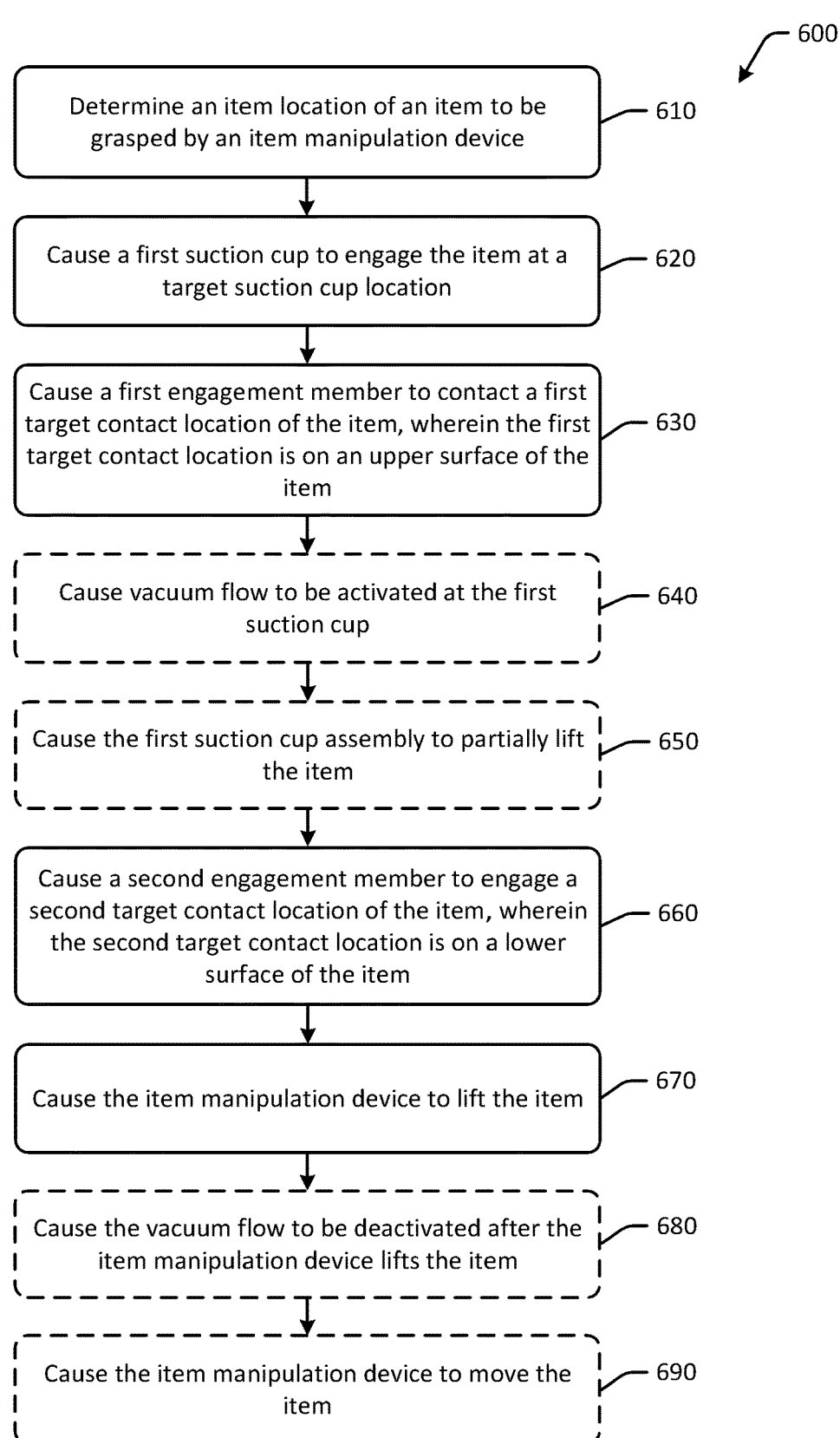

600

Determine an item location of an item to be grasped by an item manipulation device — 610

Cause a first suction cup to engage the item at a target suction cup location — 620

Cause a first engagement member to contact a first target contact location of the item, wherein the first target contact location is on an upper surface of the item — 630

Cause vacuum flow to be activated at the first suction cup — 640

Cause the first suction cup assembly to partially lift the item — 650

Cause a second engagement member to engage a second target contact location of the item, wherein the second target contact location is on a lower surface of the item — 660

Cause the item manipulation device to lift the item — 670

Cause the vacuum flow to be deactivated after the item manipulation device lifts the item — 680

Cause the item manipulation device to move the item — 690

FIG. 6

END OF ARM TOOLS HAVING BELT-DRIVEN ENGAGEMENT MEMBERS

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. Accordingly, improvements in various operations of order fulfillment, such as improvements to picking technology, sorting technology, packing technology, and so forth may be desired, such that manual efforts can be redirected to different tasks.

BRIEF DESCRIPTION OF THE DRAWINGS

FIG. 6 is an example process flow for grasping an item using an item manipulation device in accordance with one or more embodiments of the disclosure.

Figure 1A:
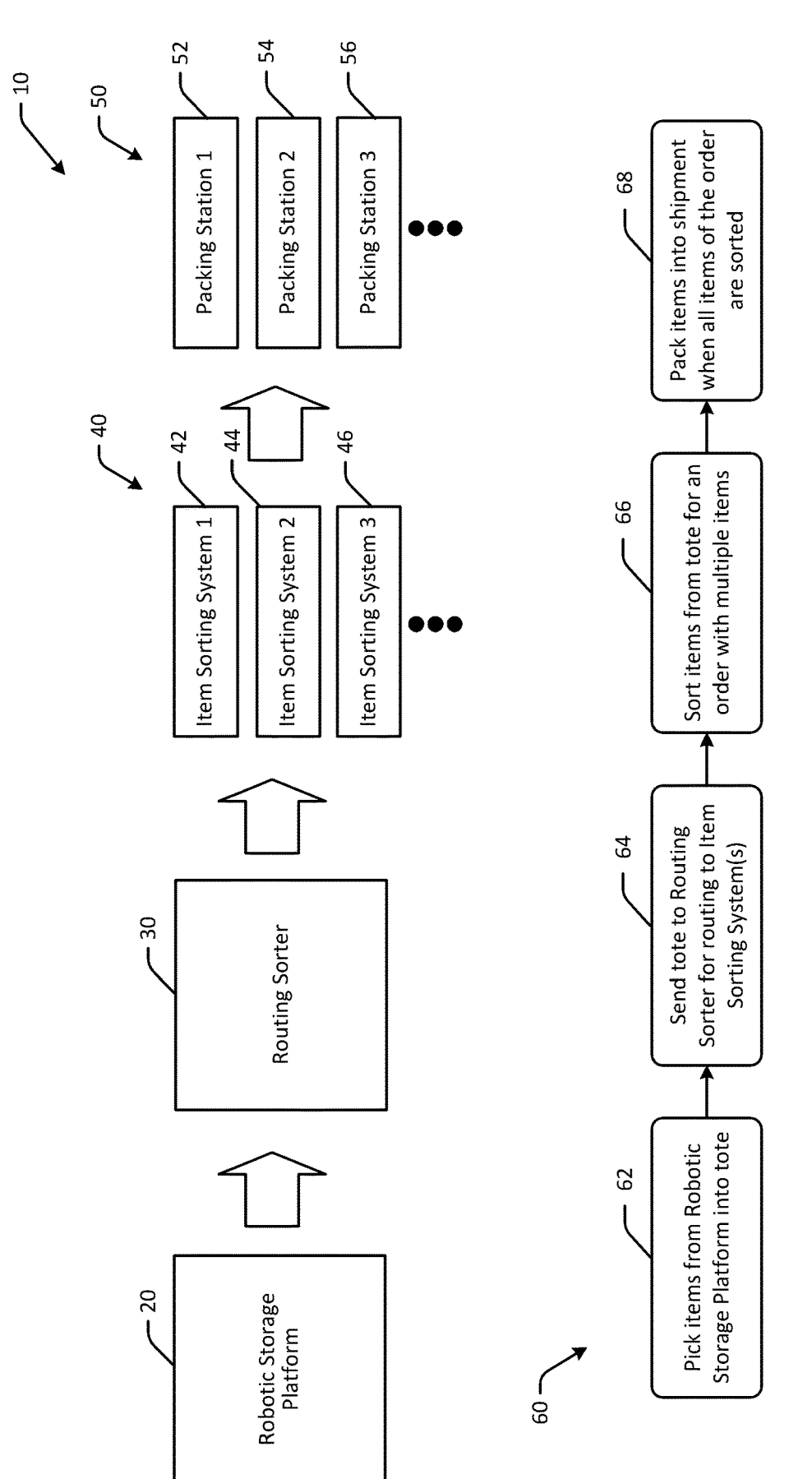
FIGS. 1A-1B are hybrid schematic illustrations of an example use case for end of arm tools having engagement members and suction cups and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

Moving items or objects through a fulfillment center may require handling of the item itself. For example, picking the item from inventory, placing the item into a container, removing the item from a container, and so forth may all be examples of actions for which an item may need to be handled. In addition, different items may have different types of packaging. For example, some items may come in boxes, some items may come in loose bags, some items may come shrink wrapped, some items may not have any packaging, and so forth. In addition, retrieving a certain number of items, such as singular items, or multiple items in cluttered environments (e.g., stacked on top of each other or otherwise in a number of layers, etc.), may be difficult, and may depend on a type of packaging in which the item comes with. Humans may be able to manually handle individual items with case. However, robotic handling of items may require various levels of dexterity. Similarly, when retrieving items from cluttered areas, such as a single item from a bin full of items, robotic manipulators may be limited by an exposed area of the item to be grasped, and so forth. Moreover, certain items, such as books, shoeboxes, and the like may be difficult to grasp using robotic manipulators due to a tendency for the item to open or for its weight to shift once lifted.

Embodiments of the disclosure include methods and systems for end of arm tools having engagement members and suction cups. The end of arm tools may be configured to handle many different types of items from cluttered and uncluttered environments. Such end of arm tools may have improved control over items, reduce a likelihood of item damage, and provide smoother unloading or ejection of items. Some embodiments include suction cup-based end effectors or end of arm tools that apply a vertical motion downforce is used, where caging fingers can follow the item with a belt, so as to cage around the item. This allows for grasping of items such as books, shoeboxes, and other items that may shift weight and/or be problematic to grasp and move using robotic manipulators. Certain embodiments include belt-driven engagement members that can be used to securely grasp items via contact at upper and lower surfaces (e.g., forming a "cage" or "caging" the item, etc.), which, in combination with suction cup assemblies, allows for grasping and transport of previously unmanageable items. Some embodiments include optimized process flows for processing of orders at fulfillment centers, as well as process flows or methods to increase speed of transporting items as a result of improved item handling. As a result, throughput of fulfillment centers may be improved, and/or logistics of fulfillment center operations may be less complicated.

Figure 1B:
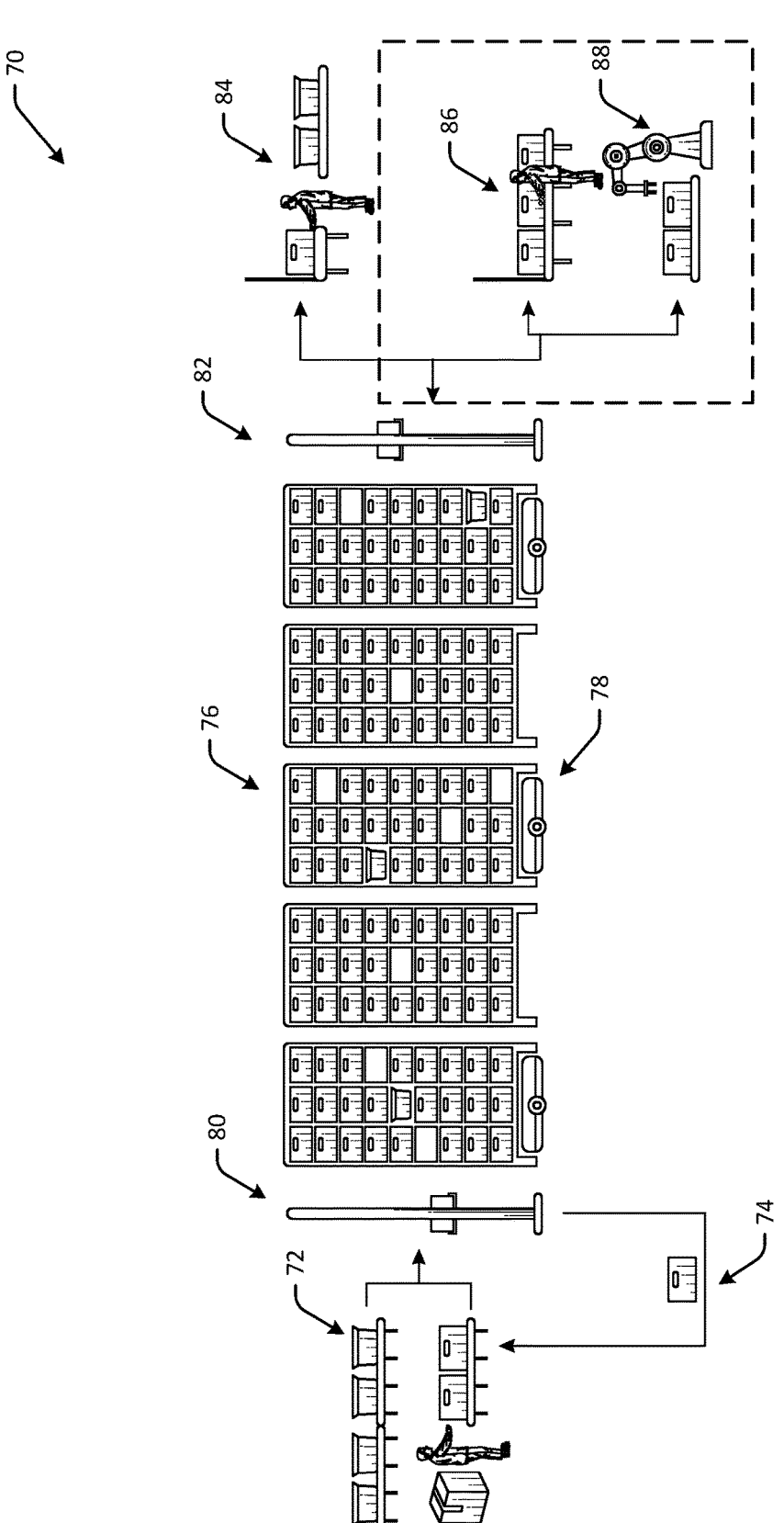

Referring to FIGS. 1A-1B, an example use case 10 for end of arm tools having engagement members and suction cups and an example process flow in accordance with one or more embodiments of the disclosure. Although discussed in the context of online orders, other embodiments may be directed to any suitable use case where products or containers are picked and/or sorted, or packages are sorted, such as instances where users may pick up orders rather than receiving a shipment, instances where items are aggregated for transport to another fulfillment center, and so forth.

In FIG. 1A, a fulfillment center may include a robotic storage platform 20, a routing sorter 30, one or more item sorting systems 40, and one or more packing stations 50. The robotic storage platform 20 may be a portion of the fulfillment center at which products picked from product inventory are placed. Inventory may be stored in containers in flexible container pods in some instances. Robots may be used with end of arm tools described herein to pick products from inventory and/or to deliver to the robotic storage platform in some instances, while in other instances, manual effort or a combination thereof may be used to pick products. The picking process at the robotic storage platform may include locating a product in an order, obtaining the product, and sending the product to the robotic storage platform 20, such as via a conveyor belt. In the illustrated embodiment, products at the robotic storage platform 20 may be placed in a container, such as a tote. The tote may optionally be assigned to, or otherwise associated with, a particular item sorting system machine in some instances. For example, a certain tote may be associated with a certain item sorting system, such that products that are designated to be picked and placed in the tote are for orders that are to be consolidated at that particular item sorting system. The association between the tote and the item sorting system may be static in some instances. In other embodiments, there may not be any association between totes and item sorting systems, or associations may be dynamic.

At the routing sorter 30, totes including products that have been picked may be routed to the appropriate or designated item sorting system. For example, the routing sorter 30 may optionally determine an identifier associated with the tote, and may determine one or more item sorting systems to which the tote is to be routed using the identifier or using another factor, such as sortation system load. The routing sorter 30 may route or direct the tote to an item sorting system.

The item sorting systems 40 may include one or more item sorting system machines. In FIG. 1A, a first item sorting system 42, a second item sorting system 44, a third item sorting system 46, and so forth may be included. Any number of item sorting systems may be included. Some or all of the item sorting systems may optionally be associated with certain totes. The item sorting systems may be used to consolidate or otherwise aggregate products for single or multi-item orders and/or for transfer to a different fulfillment center. For example, a first tote may include a first item of a multi-item order, and a second tote may include a second item of the multi-item order. The item sorting system may therefore identify the orders associated with the respective products in a tote, and may transport the products to a container, such as a tote, a flexible container, a specific chute leading to a container, or a different container associated with the order. When the order is complete with all of the products in the associated chute or container, the order may be packed. In instances where a container is designated for a different fulfillment center, as opposed to an online order, the container may be packed when full, as opposed to when certain items are placed into the container (e.g., there may not be any specific items that need to be in the container before packing, rather, the container may just be a certain threshold full, etc.). Accordingly, a specific item sorting system may be designated for fulfillment of a particular multi-item order. As a result, all of the products in the multi-item order may be placed in totes that are directed to that particular item sorting system. At the item sorting systems 40, totes that are received via the routing sorter 30 may be emptied, and the products in the respective totes may be transported to the appropriate chutes or containers for the orders for which the products were picked.

After a single or multi-item order is complete (e.g., the item sorting system has delivered all of the products in the order to the appropriate chute, container, etc.), or when a container designated for another fulfillment center is full (where full is a configurable threshold, such as about 60% full capacity, 70% full capacity, 80% full capacity, 90% full capacity, etc.), the order may be packed at the packing station 50. In some embodiments, one or more packing stations may be included. In some instances, a packing station may service more than one item sorting system, while in other instances, more than one packing station may service one item sorting system. In the illustration of FIG. 1A, a first packing station 52 may be used to pack orders from the first item sorting system 42, a second packing station 54 may be used to pack orders from the second item sorting system 44, a third packing station 56 may be used to pack orders from the third item sorting system 46, and so forth. At the packing stations 50, the orders may be placed into boxes and sealed for subsequent shipment. The packages may then be processed for shipment to the user. In another example, the containers may be stacked, closed, or otherwise packed for shipment to another fulfillment center.

At the fulfillment center, an example process flow 60 illustrated in FIG. 1A may be implemented to improve the efficiency and/or throughput of the fulfillment center. At a first block 62, items may be picked from the robotic storage platform 20 into a tote that may optionally be associated with a specific item sorting system. At a second block 64, the tote may be sent to the routing sorter 30 for routing to an item sorting system. At a third block 66, the items from the tote may be sorted for an order with multiple item by the specific item sorting system. At a fourth block 68, the items may be packed into a shipment when all of the items in the order are sorted.

In FIG. 1B, an example automated storage and retrieval environment 70 is depicted. The automated storage and retrieval environment 70 may be a containerized fulfillment center solution that stores inventory in totes and implements automated workflows. The automated storage and retrieval environment 70 may include a consolidation workflow, which involves combining inventory from emptier containers into fuller containers in order to ensure an automated induct process is not blocked due to insufficient empty/free spaces on container storage racks 76 for inserting new containers. Containerized inventory can flow through the automated storage and retrieval environment 70 via induct at containers 72 (which can include a decant process to move items to empty high capacity containers 74. A first gantry 80 may be used to load and/or unload containers from the container storage racks 76. The container storage racks 76 may be transported using autonomous robots 78. A second gantry 82 may be used to load and/or unload containers from the container storage racks 76. Containers may be moved downstream for manual or automated picking at a pick station 84, to a consolidation station 86 to consolidate items into fewer containers, and/or to robotic work cells 88 for automated picking and/or placement of items into or from containers.

Embodiments of the disclosure include end of arm tools having engagement members and suction cups that are configured to handle and/or retrieve items from bins or containers, storage areas, conveyors, and so forth. Certain embodiments may improve processing speed and/or throughput of fulfillment centers. Certain embodiments may improve performance of mechanical equipment for sortation and/or consolidation of items. While described in the context of online orders, aspects of this disclosure are more broadly applicable to other forms of object handling.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2:
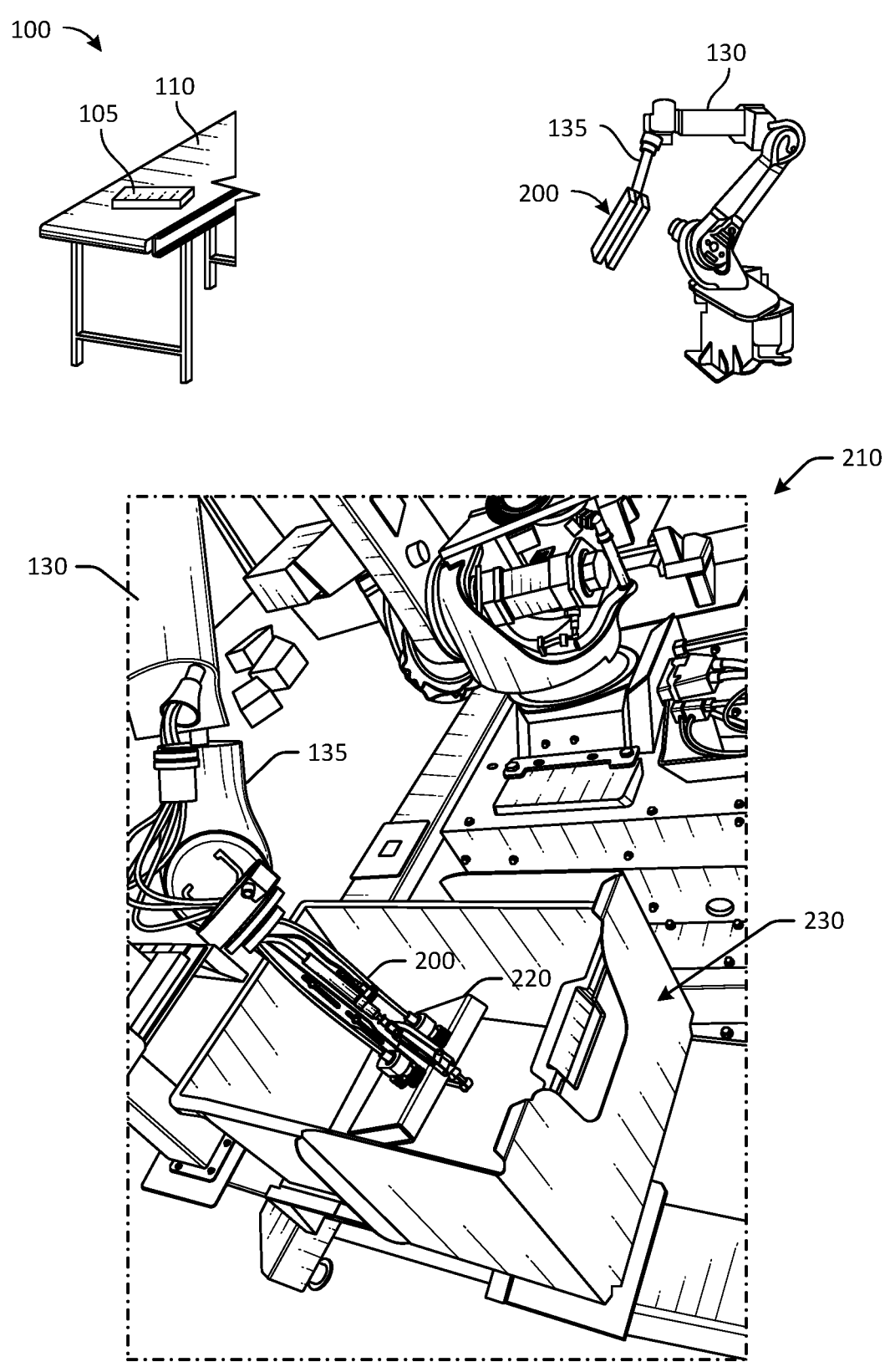
FIG. 2 is a schematic illustration of an example item handling system for moving items in accordance with one or more embodiments of the disclosure.

FIG. 2 is a schematic illustration of an example item handling system for moving items in accordance with one or more embodiments of the disclosure. Other embodiments may include additional or fewer components. The illustration of FIG. 2 may not be to scale, and may not be illustrated to scale with respect to other figures. The robotic manipulator and end of arm tool configured to grasp items illustrated in FIG. 2 may be used throughout the fulfillment center environment discussed with respect to FIGS. 1A-1B.

Inventory systems are utilized by many entities for storing and managing inventory. For example, some retailers may utilize a warehouse of racks that store items in various containers (also referred to as bins, storage locations, etc.). Items may be stowed in the various containers to hold the item in preparation for picking. For example, when an order for a specific item needs to be fulfilled by a retailer, the item can be picked (or retrieved) from the container where the item is stored. Inventory systems may use a mechanical system to stow an item into a container and/or pick an item from the container. The mechanical system may include a robotic arm that permits various sensors and end of arm tools (also referred to herein as end effectors and/or item manipulation devices) to interact with items outside and/or within multiple containers.

In some instances, the robotic arm uses an end of arm tool that can manipulate existing items within a densely packed container in order to create space to retrieve a particular item. As described herein, after grasping an item with the end of arm tool, the robotic arm can move or transport the grasped item from a first location to a second location.

By using belt-driven engagement members and suction cup(s) to grasp and cage items, the end of arm tool may be configured to operate with various robotic manipulation systems, such as robotic arms, without complications due to weight and/or size requirements. For example, the engagement members may be stored in a minimal footprint when not in use. In addition, the placement of actuators, such as motors, to drive the belts may be modified to align with a center of gravity of the end of arm tool to reduce a likelihood of uncalibration and/or wear and tear on the robotic manipulator. The belt-driven engagement members described herein may be configured to provide a sufficient amount of pressure or resistance to movement to securely grasp items of various sizes, shapes, and weights. Note that many of the embodiments herein describe an end of arm tool for a robotic arm in the context of grasping and lifting an item. In other embodiments, the end of arm tool described herein can be used for other operations, such as placing an item into a container. Further, as used herein, an "item" may refer to an individual item, multiple items, a package containing an individual item, a package containing multiple items, etc.

In FIG. 2, a stow or pick system 100 is depicted according to one embodiment. The system 100 may be located in a facility (e.g., warehouse, factory, distribution center, etc.). In one particular embodiment, the system 100 is a robotic stowing or picking system. The system 100 can be located in a fulfillment center that performs various operations in order to ship items 105 to customers. Here, the system 100 includes a conveyor 110 that can convey items to a robotic manipulator 130, where the robotic manipulator 130 may be configured to grasp the item 105. In some embodiments, the items may be singulated or spaced apart, whereas in other embodiments, the items may be cluttered together. In another environment 210, the robotic manipulator 130 may be configured to retrieve items 220 from a container 230, where the item may be the only item in the container 230, or may be cluttered with other items in the container 230.

In the depicted embodiment, the robotic manipulator 130 includes a mount 135, which can support various sensors and end of arm tools for stowing and/or picking items from the containers 230. Here, for example, the mount 135 supports an end of arm tool 200, which includes one or more engagement members and one or more suction cups for grasping, transporting, picking items from a container or other surface, and/or stowing items into a particular container. As noted, the end of arm tool 200 can grasp an item 105 located on the conveyor 110, in the container 230, and elsewhere.

One or more sensors may be included. The sensor(s) may be a visual sensor, depth sensor, infrared sensor, barcode reader, force sensing sensor, pressure sensor, gyroscope, accelerometer, or combinations thereof. The sensor(s) can be any sensor that permits the system 100 to identify occupied versus empty space in the container, identify the arrangement of items in the container, identify the type or number of items in the container, determine a target grasp point at which to grasp the item, determine an orientation of the end of arm tool 200, identify the individual items in the container, and the like. The sensor(s) can be disposed in different locations on the robotic manipulator 130 and/or end of arm tool 200. For example, the sensor(s) can be mounted to one or more of the components of the end of arm tool 200 to allow the end of arm tool 200 to determine the amount of force applied to an item when grasping the item.

In example embodiments, the end effectors described herein may include one or more suction cups to engage one or more portions of an item. In addition, the end effectors may include one or more grasping fingers or engagement members to grasp and cage an item. In some example embodiments, grasping of an item may comprise gripping, pinching, holding, squeezing, or otherwise grabbing an item via one or more portions of the item, and caging of an item may comprise surrounding, enveloping, encircling, restraining, constraining, or otherwise enclosing one or more portions, or substantially all portions, of an item.

The one or more grasping fingers or engagement members may move between at least two positions, e.g., an open position and a closed position. In the open position, the grasping fingers or engagement members may release an item, and in the closed position, the grasping fingers or engagement members may grasp an item. For example, various types of actuators, such as pneumatic actuators, servos, solenoids, motors, shape memory alloys, or combinations thereof, may cause the grasping fingers or engagement members to move between at least the open position and the closed position. Further, the grasping fingers or engagement members may be formed of various materials, such as silicone, rubber, plastics, composites, metals, or combinations thereof, that may provide flexibility, elasticity, and/or stiffness to portions of the grasping fingers, and may also have various friction properties to grasp an item.

Using a generated item grasp strategy for the item, a robotic arm and end effector may be instructed to grasp the item. For example, the robotic arm and end effector may be positioned and oriented based on the grasp point and/or approach trajectory. In addition, the robotic arm and end effector may initiate grasping of the item based on a grasping type (such as picking, scooping, sliding, pushing, turning, re-orienting, etc.), grasping sequence, suction forces, grasping forces, other forces, or other grasp characteristics of the item. Further, the robotic arm and end effector may move or transfer the grasped item based on a movement type, movement sequence, direction, speed, acceleration, or other movement characteristics of the item.

The end effectors and associated methods to grasp items described herein may enable reliable and efficient grasping of various types of items by using combinations of suction, grasping, pinching, sliding, scooping, lifting, caging, and/or other types of grasping movements. Further, the end effectors and associated methods to grasp items described herein may also reduce the potential for opening, stretching, ripping, tearing, dropping, or otherwise damaging such items during grasping and movement.

Figure 3:
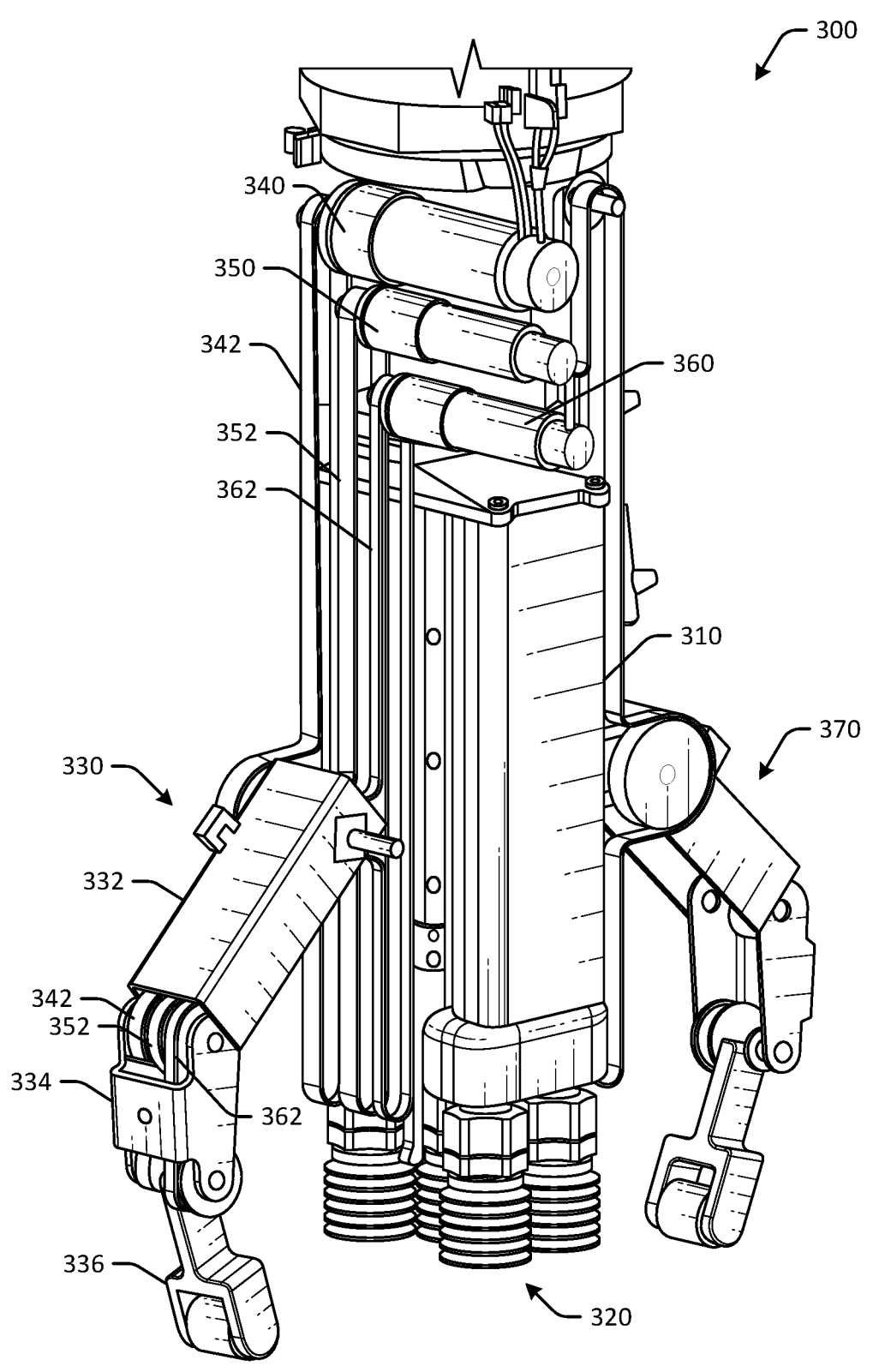
FIG. 3 is a schematic illustration of an item manipulation device in accordance with one or more embodiments of the disclosure.

FIG. 3 is a schematic illustration of an item manipulation device 300 in accordance with one or more embodiments of the disclosure. Other embodiments may include additional or fewer components. The illustration of FIG. 3 is not to scale, and may not be illustrated to scale with respect to other figures. The item manipulation device illustrated in FIG. 3 may be the same end of arm tool and/or end effector discussed with respect to FIGS. 1A-2.

In FIG. 3, the item manipulation device 300 may be coupled to a robotic manipulator, such as a robotic arm, a gantry, or other type of manipulator. The item manipulation device 300 may be configured to grasp items in cluttered or uncluttered environments using one or more engagement members and/or one or more suction cups.

For example, the item manipulation device 300 may include a housing 310. The housing 310 may form a central body of the item manipulation device 300. In some embodiments, a center of gravity of the item manipulation device 300 may be disposed along an axial axis of the housing 310.

The item manipulation device 300 may include a suction cup assembly 320 having one or more suction cups. For example, the suction cup assembly 320 may include a first suction cup, a second suction cup, and so forth. The suction cup(s) may be disposed in various patterns or orientations, such as a hexagonal arrangement, a linear arrangement, and so forth. In some embodiments, the suction cup assembly 320 may have a fixed position relative to the housing 310, whereas in other embodiments, one or more of the suction cups of the suction cup assembly 320 may be extendable relative to the housing 310. The suction cup assembly 320 may be positioned at a distal end of the housing 310, as depicted in the example of FIG. 3.

The item manipulation device 300 may include one or more engagement members that may be used to grasp, lift, and/or move items such as shoeboxes, books, and the like where the item may have weight that shifts during movement or that is otherwise difficult to grasp. Some embodiments may use engagement members to grasp items from upper and/or lower surfaces.

In FIG. 3, the item manipulation device 300 may include a first engagement member 330 and a second engagement member 370. Other embodiments may include a single engagement member or more than two engagement members. The first engagement member 330 may be disposed on a first side of the housing 310, and the second engagement member 370 may be disposed on a second side of the housing 310. The first side may be opposite the second side in some instances. Other embodiments may have different positioning of engagement members. In some embodiments, the engagement members may have a fixed vertical position relative to the housing 310 and/or the other engagement member(s). In other embodiments, one or more of the engagement members may be configured to slide along the housing 310. For example, the first engagement member 330 may be configured to slide along the housing 310, such that its position relative to the second engagement member 370 may change. In other embodiments, the first engagement member 330 may have a fixed position relative to the housing 310 and/or the second engagement member 370. The first engagement member 330 may be configured to slide along the housing 310.

The first engagement member 330 may include one or more arm portions. The arm portions may be driven or actuated by one or more belts. For example, the first engagement member 330 may have a first arm portion 332 that is configured to rotate with respect to the housing 310. For example, the first arm portion 332 may be configured to rotate towards an upper end and/or lower end of the housing 310. The first engagement member 330 may include a second arm portion 334 that is configured to rotate with respect to the first arm portion 332. For example, the second arm portion 334 may rotate towards and/or away from the first arm portion 332. The first engagement member 330 may include a third arm portion 336 configured to rotate with respect to the second arm portion 334. For example, the third arm portion 336 may rotate towards and/or away from the second arm portion 334. In some embodiments, coupling between arm portions may be via one-way bearings to provide additional rigidity and/or resistance to movement during motion of the robotic manipulator and/or end of arm tool. For example, the third arm portion 336 can be coupled to the second arm portion 334 via a one-way bearing. Additional or fewer arm portions may be included. A distal end of the first engagement member 330 (e.g., a distal end of the third arm portion 336, etc.) may have various geometries or configurations, and may be in the shape of a finger or nail in some embodiments. Other embodiments may have spherical shaped distal ends. In some embodiments, the first engagement member 330 may be devoid of suction or vacuum flow (and corresponding suction cups). For example, the first engagement member 330 may be devoid of a suction cup. Other embodiments may include vacuum flow coupled to the first engagement member 330.

The item manipulation device 300 may include one or more belts configured to actuate movement of the first engagement member 330 and/or individual arm portions of the first engagement member 330. For example, the item manipulation device 300 may include a first belt 342 configured to actuate the first arm portion 332, a second belt 352 configured to actuate the second arm portion 334, and a third belt 362 configured to actuate the third arm portion 336. The belts may be formed of various materials, such as steel, metal, rubber, plastic, or other suitable materials. In some embodiments, the belts may be a form of timing belt.

The item manipulation device 300 may include one or more actuators to drive one or more of the belts. For example, the item manipulation device 300 may include a first actuator 340 configured to drive the first belt 342, a second actuator 350 configured to drive the second belt 352, and a third actuator 360 configured to drive the third belt 362. Any number of actuators may be included. For example, one actuator may be configured to drive more than one belt in some embodiments. The actuators may be motors, servos, or other types of actuators configured to impart motion to the respective belts.

The first belt 342 may be coupled to the first actuator 340 and the first arm portion 332, and rotation of the first belt 342 may cause rotation of the first arm portion 332. The second belt 352 may be coupled to the second actuator 350 and the second arm portion 334, and rotation of the second belt 352 may cause rotation of the second arm portion 334. The third belt 362 may be coupled to the third actuator 360 and the third arm portion 336, and rotation of the third belt 362 may cause rotation of the third arm portion 336. For example, rotation of the second belt 352 may cause the second arm portion 334 to rotate with respect to the first arm portion 332, and rotation of the third belt 362 may cause the third arm portion 336 to rotate with respect to the second arm portion 334.

The first actuator 340, the second actuator 350, and the third actuator 360 may be disposed at a proximal end, or an upper end, of the housing 310 as depicted in the example of FIG. 3. Depending on sizes and/or weights of the respective actuators, the placement of the actuators can be arranged such that the center of gravity of the item manipulation device 300 is not significantly impacted, thereby reducing a risk of wear and tear on the item manipulation device 300 and/or robotic manipulator to which it is coupled.

The second engagement member 370 may include the same or similar components as the first engagement member 330, such as a second arm portion configured to rotate with respect to the housing 310, and so forth. The first engagement member 330 may be positioned at the same vertical positon or at a different vertical positon along the housing 310 than the second engagement member 370.

The item manipulation device 300 may include one or more actuators for the suction cup assembly 320. For example, the item manipulation device 300 may include a pneumatic actuator that may provide suction, vacuum force, negative pressure, and/or positive pressure. When actuated, the actuator may cause application of suction, vacuum, or negative pressure to the suction cup assembly 320, such that the suction cup assembly 320 may engage and/or lift a portion of an item. The suction cup assembly 320 may be formed of various materials, such as silicone, rubber, plastics, composites, metals, or combinations thereof. In other example embodiments, the actuator may include various other types of actuators, such as a servo, a solenoid, a motor, or a shape memory alloy.

In one embodiment, the item manipulation device 300 may include the housing 310, the suction cup assembly 320 having a first suction cup, where the suction cup assembly 320 is positioned at a distal end of the housing 310, a first engagement member 330 having a first arm portion 332 configured to rotate with respect to the housing 310, a first belt 342 coupled to the first arm portion 332, and a first actuator 340 configured to actuate the first belt 342 to cause the first arm portion 332 to rotate with respect to the housing 310.

Figure 4A:
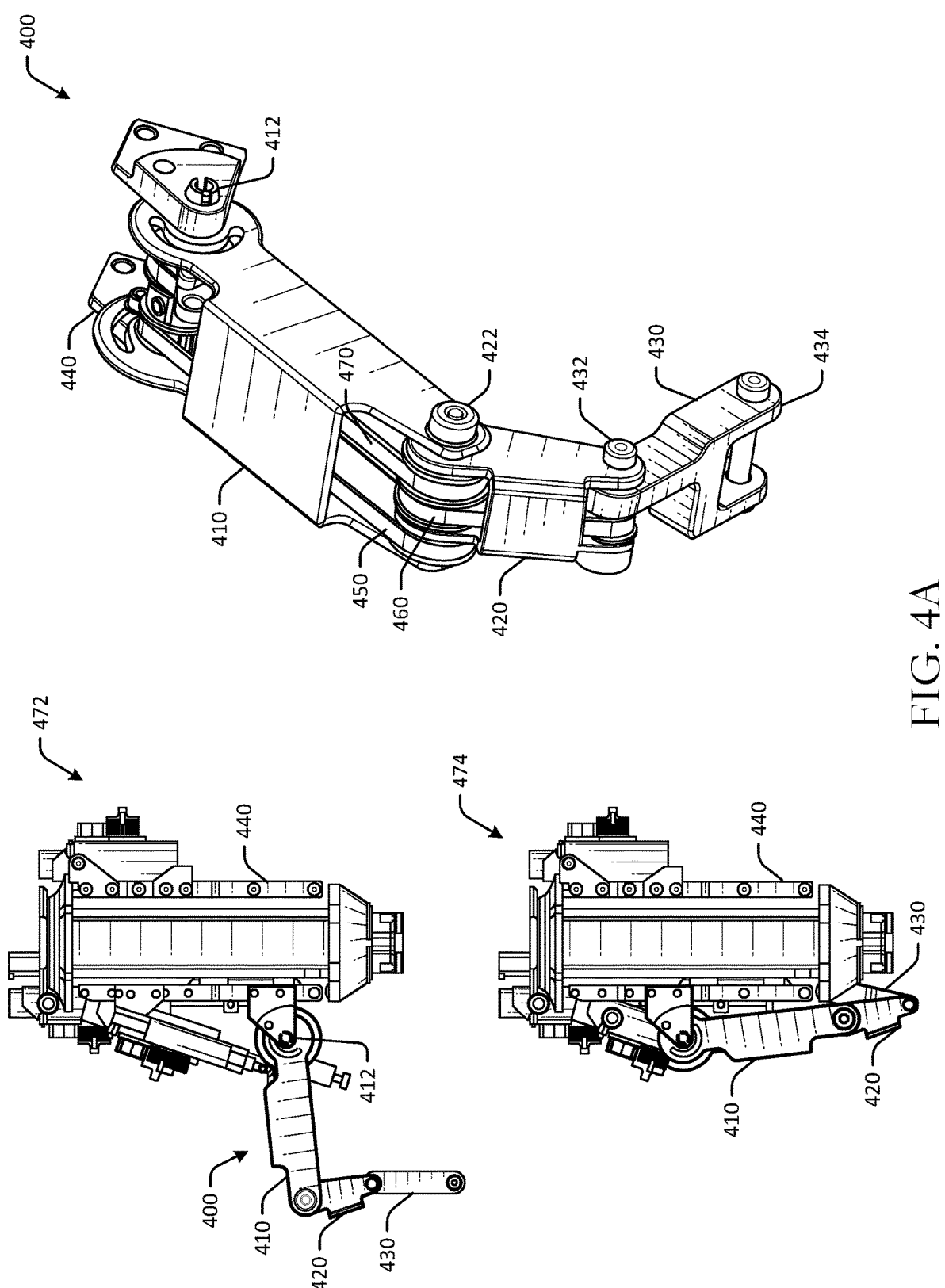
FIGS. 4A-4B are schematic illustrations of an engagement member of an end of arm tool in isolated view, as well as in various positions, in accordance with one or more embodiments of the disclosure.
Figure 4B:
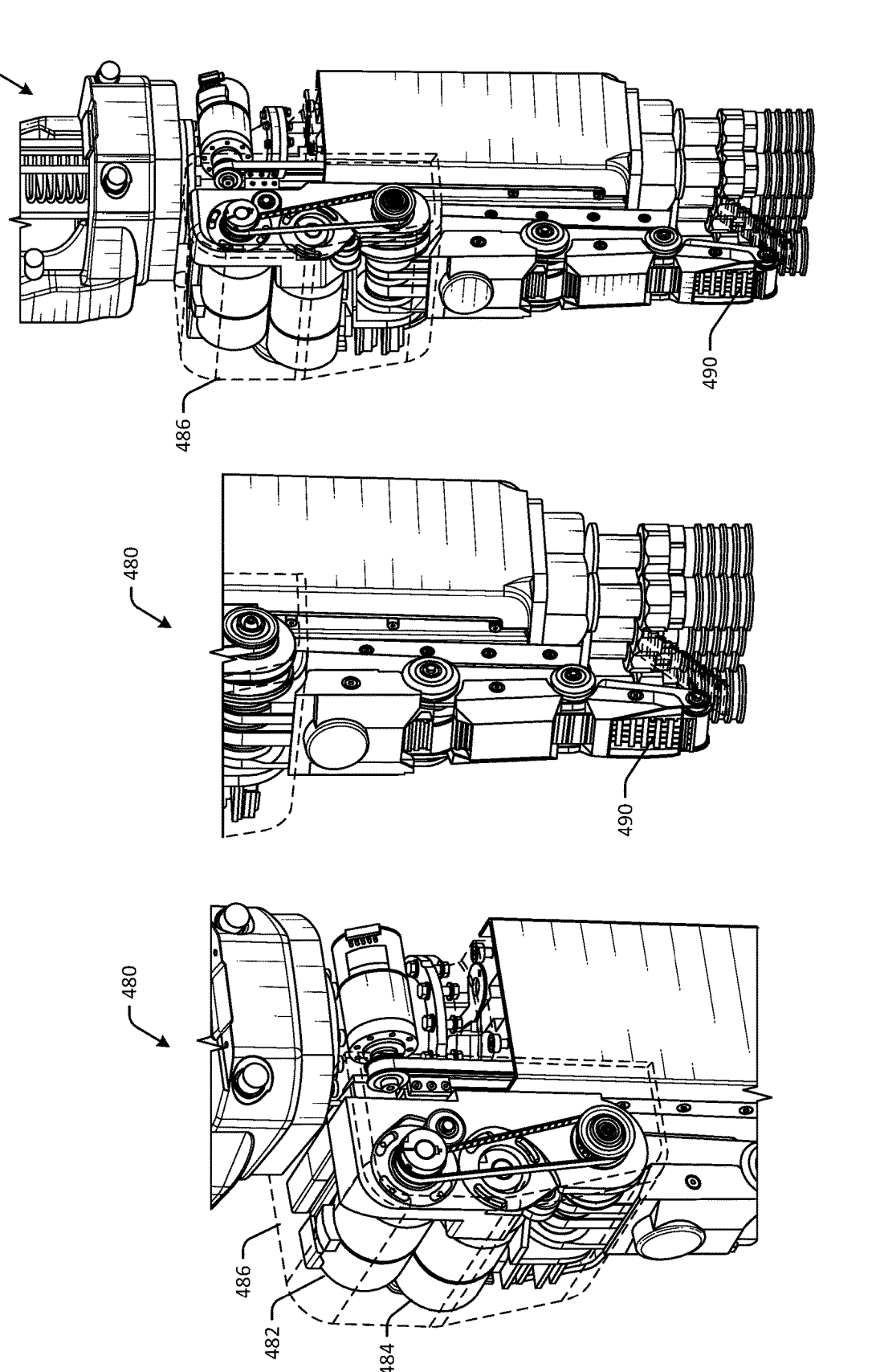

FIGS. 4A-4B are schematic illustrations of an engagement member 400 of an end of arm tool 440 in isolated view, as well as in various positions, in accordance with one or more embodiments of the disclosure. Other embodiments may include additional or fewer components. The illustrations of FIGS. 4A-4B are not to scale, and may not be illustrated to scale with respect to other figures. The engagement member and end of arm tool illustrated in FIGS. 4A-4B may be the same engagement member and end of arm tool discussed with respect to FIGS. 1A-3.

In FIG. 4A, the engagement member 400 is depicted in isolated view and may be the same as the first or second engagement members discussed with respect to FIG. 3. The engagement member 400 may be coupled to the end of arm tool 440. The end of arm tool 440 may be an item manipulation device that is configured to retrieve, grasp and/or secure, move, and unload items of varying sizes and shapes, ranging from t-shirts (e.g., floppy items, etc.) to basketballs (e.g., round or cylindrical items, etc.) to boxed items (e.g., shoeboxes, etc.). The end of arm tool 440 may be coupled to a robotic manipulator, such as a robotic arm, a gantry, or other type of manipulator. The end of arm tool 440 may have six degrees of freedom relative to the robotic manipulator in some embodiments. In other embodiments, the end of arm tool 440 may have at least four degrees of freedom relative to the robotic manipulator. The end of arm tool 440 may be configured to rotate 360 degrees relative to an attachment point to the robotic manipulator, such that an item grasped by the end of arm tool 440 can be rotated to an inverted position and then back to an upright position. In some embodiments, the end of arm tool 440 may be coupled to the robotic manipulator via a quick-connect attachment. The end of arm tool 400 may include a base about which the end of arm tool 440 can rotate 360 degrees.

The engagement member 400 may include a first arm portion 410, a second arm portion 420, and a third arm portion 430. An end 434 of the third arm portion 430 may be configurable for various applications, and may be a bar, a sphere, a rubber component, or another type of component. The first arm portion 410 may rotate about joint 412 with respect to the end of arm tool 440. The second arm portion 520 may rotate about joint 422 with respect to the first arm portion 410. The third arm portion 430 may rotate about joint 432 with respect to the second arm portion 420. The engagement member 400 may include a first belt 450 to drive rotation of the first arm portion 410, a second belt 460 to drive rotation of the second arm portion 420, and a third belt 470 to drive rotation of the third arm portion 430.

As depicted in an open configuration 472, the engagement member 400 may be extended away from the end of arm tool 440. As depicted in a closed or stored configuration 474, the engagement member 400 may be positioned adjacent to a housing of the end of arm tool 440. For example, in the stored position 474, the first arm portion 410 and the second arm portion 420 of the engagement member 400 may be substantially axially aligned or in a substantially linear arrangement (e.g., between 160 and 200 degrees, etc.), and the third arm portion 430 may be disposed at an acute angle or substantially acute angle relative to the second arm portion 420 (e.g., less than or equal to 45 degrees, etc.). This arrangement may allow for improved operation of the end of arm tool 440 when the engagement member 400 is not in use.

In FIG. 4B, another embodiment of an engagement member 480 is depicted in various close-up and perspective views. In the illustrated embodiment, the actuators for one or more of the arm portions may be disposed adjacent to the respective arm portions instead of at a proximal end of the assembly. For example, the first actuator may be disposed at a proximal end of the housing, whereas a second actuator 482 and a third actuator 484 may be disposed adjacent to the second arm portion and the third arm portion, respectively. Such an arrangement may allow for improved locking of arm position and reduced weight due to shorter belt lengths. The actuators 482, 484 may be disposed in a housing 486 to protect against external elements.

Figure 5:
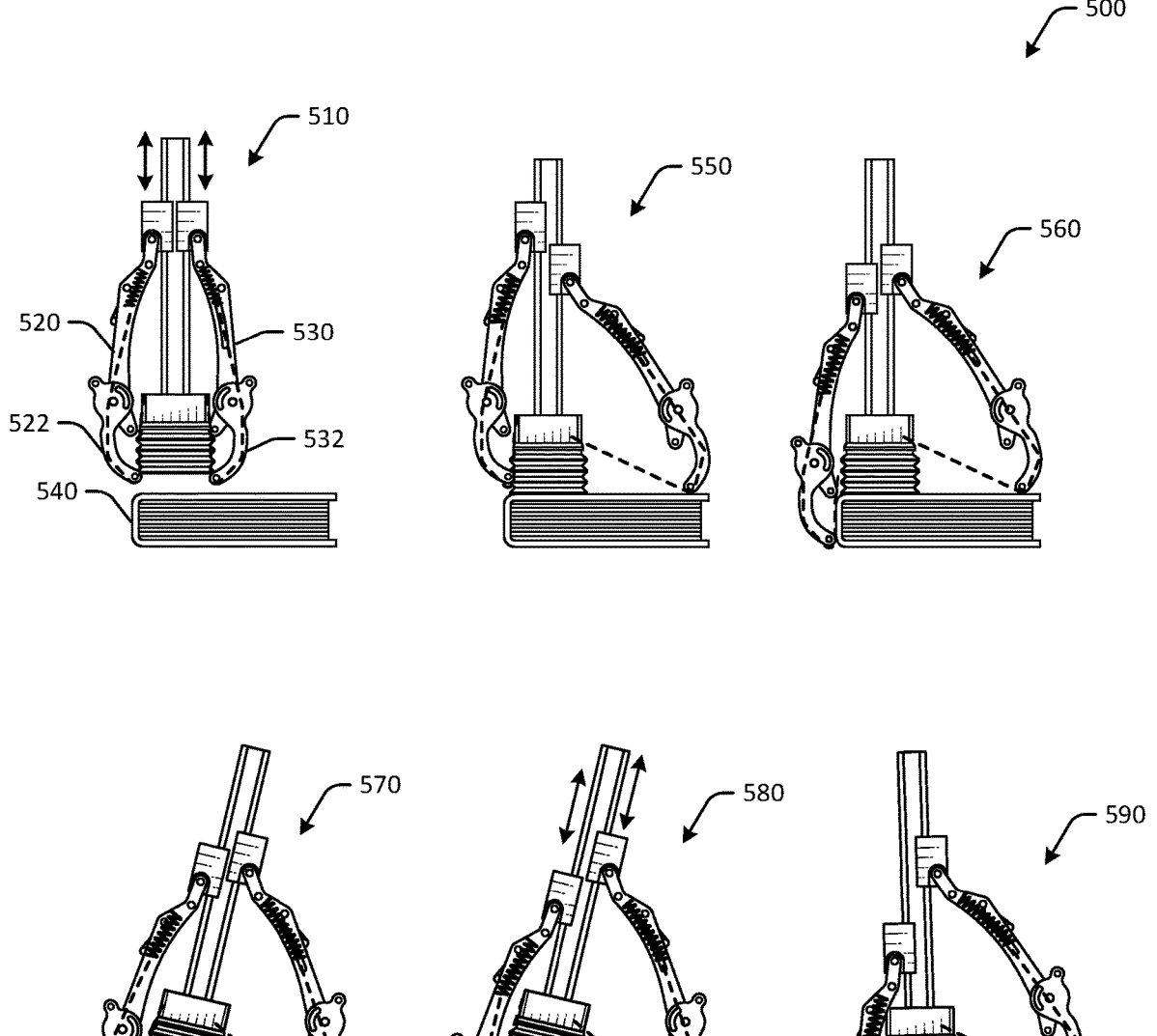
FIG. 5 is a schematic illustration of a belt-driven end of arm tool in various stages of grasping an item in accordance with one or more embodiments of the disclosure.

The engagement member 480 may include one or more external belts 490 that may be coupled to one or more engagement members. For example, as depicted in FIG. 5, the external belt 490 may be coupled to two engagement members and may allow for increased grasping ability over certain types of items, such as items in loose packaging. In one example, the end of arm tool and/or engagement member 480 may include the external belt 490, where the external belt 490 can be disposed along an outer surface of the first engagement member (e.g., engagement member 480, etc.). The external belt 490 may be coupled to both the first engagement member and a second engagement member in some embodiments.

FIG. 5 is a schematic illustration of a belt-driven end of arm tool 500 in various stages of grasping an item in accordance with one or more embodiments of the disclosure. Other embodiments may include additional or fewer components. The illustrations of FIG. 5 are not to scale, and may not be illustrated to scale with respect to other figures. The end of arm tool or item manipulation device illustrated in FIG. 5 may be the end of arm tool or item manipulation device and/or may be used with the systems discussed with respect to FIGS. 1A-4.

At a first instance 510, the end of arm tool 500 may have a first engagement member 520 and a second engagement member 530. A first arm portion 522 may be disposed at an end of the first engagement member 520, and a second arm portion 532 may be disposed at an end of the second engagement member 530. The first engagement member 520 and the second engagement member 530 may slide relative to the housing of the end of arm tool 500.

The end of arm tool 500 may be moved into position to lift an item 540, such as a book. In particular, the end of arm tool 500 may be moved into position at a spine end or spine side of the item 540. To determine the spine location of the book, one or more sensors, such as cameras, may be used. For example, an imaging device may capture imaging data of an item to be grasped. For example, the imaging device may comprise a camera, imaging sensor, or various other types of imaging devices. The imaging data may include a representation of the item, as well as representations of one or more other items and/or portions of an environment or container around the item. The imaging data may be processed using various types of image recognition techniques or algorithms, e.g., edge detection, surface detection, feature detection, object detection, machine learning, and/or various other types of image recognition or computer vision techniques or algorithms Based on the processed imaging data, various attributes or characteristics of an item may be determined. For example, an item type, identity, shape, size, dimensions, weight, volume, pose including position and/or orientation, packaging material, packaging attributes including seams, corners, edges, hinges, flaps, covers, lids, or others, position and/or orientation relative to one or more other items in proximity, position and/or orientation relative to portions of an environment or container, and/or various other attributes or characteristics of items.

In the example of FIG. 5, imaging data of the item 540 may be processed to determine that the item 540 is a hardcover book having a spine or binding, with particular shape, size, dimensions, weight, and/or volume, and that is resting on a support surface at a particular position and/or orientation. One or more grasp points, one or more approach trajectories, one or more grasp characteristics, and/or one or more movement characteristics may also be determined based on the processed imaging data and/or various attributes or characteristics of an item. The determined attributes of an item, grasp points, approach trajectories, grasp characteristics, and/or movement characteristics may include portions of an item grasp strategy for the item.

For example, one or more grasp points at which to grasp and cage the item may be determined based on the processed imaging data and/or various attributes or characteristics of an item. The grasp points may be determined based on item type, identity, shape, size, dimensions, weight, volume, pose, packaging material, packaging attributes, position and/or orientation relative to one or more other items in proximity, position and/or orientation relative to portions of an environment or container, and/or various other attributes or characteristics. For books, magazines, or similar items, the grasp points may include portions, surfaces, or edges along spines or bindings of the items. For boxes or containers with openable lids or covers, the grasp points may include seams or interfaces between covers and other static portions of the containers. For items in flexible or plastic packaging, the grasp points may include corners, edges, or seams of the flexible packaging. Various other grasp points may be determined and used to grasp various types of items Further, one or more approach trajectories by which to move or advance toward the item to grasp may also be determined based on the processed imaging data and/or various attributes or characteristics of an item. For example, the approach trajectories may include particular positions and/or orientations of a robotic end effector to move toward and initiate grasping of an object. The approach trajectories may be determined based on item type, identity, shape, size, dimensions, weight, volume, pose, packaging material, packaging attributes, position and/or orientation relative to one or more other items in proximity, position and/or orientation relative to portions of an environment or container, and/or various other attributes or characteristics, as well as one or more determined grasp points. Example approach trajectories may also include various types of grasping techniques, such as picking, scooping, sliding, pushing, turning, re-orienting, and/or other techniques or movements. Various types of techniques or algorithms may be used to determine the approach trajectories, such as motion planning optimization algorithms, dense robot streaming motion interfaces, heuristics, machine learning algorithms, and/or various other techniques or algorithms.

Furthermore, one or more movement characteristics by which to move or transfer the grasped and caged item may also be determined based on the processed imaging data and/or various attributes or characteristics of an item. For example, the movement characteristics may include movement types, movement sequences, directions, speeds, accelerations, or other movement characteristics of the item. The movement characteristics may be determined based on item type, identity, shape, size, dimensions, weight, volume, pose, packaging material, packaging attributes, position and/or orientation relative to one or more other items in proximity, position and/or orientation relative to portions of an environment or container, and/or various other attributes or characteristics, as well as one or more determined grasp points, approach trajectories, and/or grasp characteristics. Example movement characteristics may include vertical or horizontal translation, rotational movements, sliding, pushing, pulling, or dragging movements, various speeds, various accelerations, combinations or sequences of different movements, and/or various other movement characteristics.

At a second instance 550, the suction cup(s) of the end of arm tool 500 may be moved into contact with the item 540. Suction may be activated at the suction cup(s). At a third instance 560, the first engagement member 520 may be moved into position adjacent to a lower surface of the item 540, and the second engagement member 530 may be moved into contact at an upper surface of the item 540 an end of the upper surface opposite the suction cup(s). At a fourth instance 570, the item 540 may be partially lifted using the suction cup(s) while the second engagement member 530 remains in contact with the upper surface. At a fifth instance 580, the first arm portion 522 may be moved underneath the item 540. At a sixth instance 590, the item 540 may be lifted upwards and suction may be deactivated. The first engagement member 520 and/or the second engagement member 530 may remain in fixed positions to support the item 540 during lifting and/or movement.

FIG. 6 depicts an example process flow 600 for grasping an item using an item manipulation device in accordance with one or more embodiments of the disclosure. While example embodiments of the disclosure may be described in the context of grasping and lifting items, it should be appreciated that the disclosure is more broadly applicable to any type of item movement, such as placing and/or storing items. Some or all of the blocks of the process flows in this disclosure may be performed in a distributed manner across any number of devices. The operations of the process flow 600 may be optional and may be performed in a different order.

The process flow 600 may be executed by a controller having one or more computer processors and may be performed in conjunction with an item manipulation device having a first suction cup assembly with a first suction cup, a first engagement member, and a second engagement member. In some embodiments, both the first engagement member and the second engagement member are devoid of suction cups, whereas in other embodiments, one or both the first engagement member and the second engagement member may include suction cups.

At block 610 of the process flow 600, computer-executable instructions stored on a memory of a device, such as a remote server or an item manipulation device, may be executed to determine an item location of an item to be grasped by an item manipulation device. For example, one or more image processing modules may determine an item location of an item to be grasped by an item manipulation device. Images may be captured using one or more sensors, and may be processed using computer vision. For example, the item location of an item to be grasped may be determined in a cluttered environment, on a clean surface, and so forth. The image(s) may be processed to determine a target suction cup location at which the suction cup(s) of the item manipulation device are to engage the item.

In some embodiments, one or more imaging devices, cameras, imaging sensors, or other types of imaging devices may capture imaging data of an item. The imaging data may include a representation of the item, as well as representations of other items and/or portions of the environment or container proximate the item. Further, a control system may receive the imaging data of the item. The imaging data may be processed to determine at least one attribute of the item. For example, the imaging data may be processed using various types of image recognition techniques or algorithms, e.g., edge detection, surface detection, feature detection, object detection, machine learning, and/or various other types of image recognition or computer vision techniques or algorithms. Based on the processing of the imaging data, one or more attributes or characteristics of the item may be determined, such as an item type, identity, shape, size, dimensions, weight, volume, pose including position and/or orientation, packaging material, packaging attributes including seams, corners, edges, hinges, flaps, covers, lids, or others, position and/or orientation relative to one or more other items in proximity, position and/or orientation relative to portions of an environment or container, and/or various other attributes or characteristics of items. Further, a control system may process the imaging data to determine at least one attribute of the item The controller may determine a grasp point of the item based on the at least one attribute in some embodiments. For example, one or more grasp points of the item may be determined using various processing algorithms, such as edge detection, surface detection, feature detection, machine learning, and/or various other processing techniques or algorithms, as well as based on the at least one attribute of the item. For books, magazines, or similar items, the grasp points may include portions, surfaces, or edges along spines or bindings of the items. For boxes or containers with openable lids or covers, the grasp points may include seams or interfaces between covers and other static portions of the containers. For items in flexible or plastic packaging, the grasp points may include corners, edges, or seams of the flexible packaging. Various other grasp points may be determined and used to grasp various types of items. Further, a control system may determine a grasp point of the item At block 620 of the process flow 600, computer-executable instructions stored on a memory of a device, such as a remote server or an item manipulation device, may be executed to cause the first suction cup to engage the item at a target suction cup location. For example, the control module at a remote server may cause the first suction cup to engage the item at a target suction cup location. The controller may cause the first suction cup of the item manipulation device to engage the item at the determined target suction cup location.

At block 630 of the process flow 600, computer-executable instructions stored on a memory of a device, such as a remote server or an item manipulation device, may be executed to cause the first engagement member to contact a first target contact location of the item, wherein the first target contact location is on an upper surface of the item. For example, the control module at a remote server may cause the first engagement member to contact a first target contact location of the item, wherein the first target contact location is on an upper surface of the item. The first engagement member may be moved into contact with the upper surface of the item at a predetermined location determined using the imaging of the item. In some embodiments, the first suction cup may engage the item prior to the first engagement member contacting the item. The target suction cup location may be at a first side of the upper surface, and the first target contact location may be at a second side of the upper surface opposite the first side, as discussed at least with respect to FIG. 8.

At optional block 640 of the process flow 600, computer-executable instructions stored on a memory of a device, such as a remote server or an item manipulation device, may be executed to cause vacuum flow to be activated at the first suction cup. For example, the control module at a remote server may cause vacuum flow to be activated at the first suction cup.

At optional block 650 of the process flow 600, computer-executable instructions stored on a memory of a device, such as a remote server or an item manipulation device, may be executed to cause the first suction cup assembly to partially lift the item. For example, the control module at a remote server may cause the first suction cup assembly to partially lift the item. The end of arm tool may be lifted upwards at an angle using a robotic manipulator. In some embodiments, the first suction cup assembly may be caused to partially lift the item prior to causing the second engagement member to contact the second target contact location. Moreover, in some instances, vacuum flow may be activated at the first suction cup prior to causing the first suction cup assembly to partially lift the item.

At block 660 of the process flow 600, computer-executable instructions stored on a memory of a device, such as a remote server or an item manipulation device, may be executed to cause the second engagement member to engage a second target contact location of the item, wherein the second target contact location is on a lower surface of the item. For example, the control module at a remote server may cause the second engagement member to engage a second target contact location of the item, wherein the second target contact location is on a lower surface of the item. The second engagement member may therefore clamp or cage the item. The second target contact location may be determined using the imaging of the item and/or may be determined based at least in part on the target suction cup location (e.g., the same side and opposite surface relative to the first target contact location, etc.) and/or the first target contact location (e.g., the opposite side and surface relative to the first target contact location, etc.). The second target contact location may be at a first side of the lower surface, where the first side of the lower surface corresponds to the first side of the upper surface.

At block 670 of the process flow 600, computer-executable instructions stored on a memory of a device, such as a remote server or an item manipulation device, may be executed to cause the item manipulation device to lift the item. For example, the control module at a remote server may cause the item manipulation device to lift the item via the robotic manipulator.

At optional block 680 of the process flow 600, computer-executable instructions stored on a memory of a device, such as a remote server or an item manipulation device, may be executed to cause the vacuum flow to be deactivated after the item manipulation device lifts the item. For example, the control module at a remote server may cause the vacuum flow to be deactivated after the item manipulation device lifts the item. The item may remain caged or clasped by the engagement fingers.

At optional block 690 of the process flow 600, computer-executable instructions stored on a memory of a device, such as a remote server or an item manipulation device, may be executed to cause the item manipulation device to move the item. For example, the control module at a remote server may cause the item manipulation device to move the item. The item may be moved from a first location to a second location after lifting. The first engagement member and/or the second engagement member may remain in contact with and/or remain in fixed positions while the item manipulation device moves the item.

Figure 7:
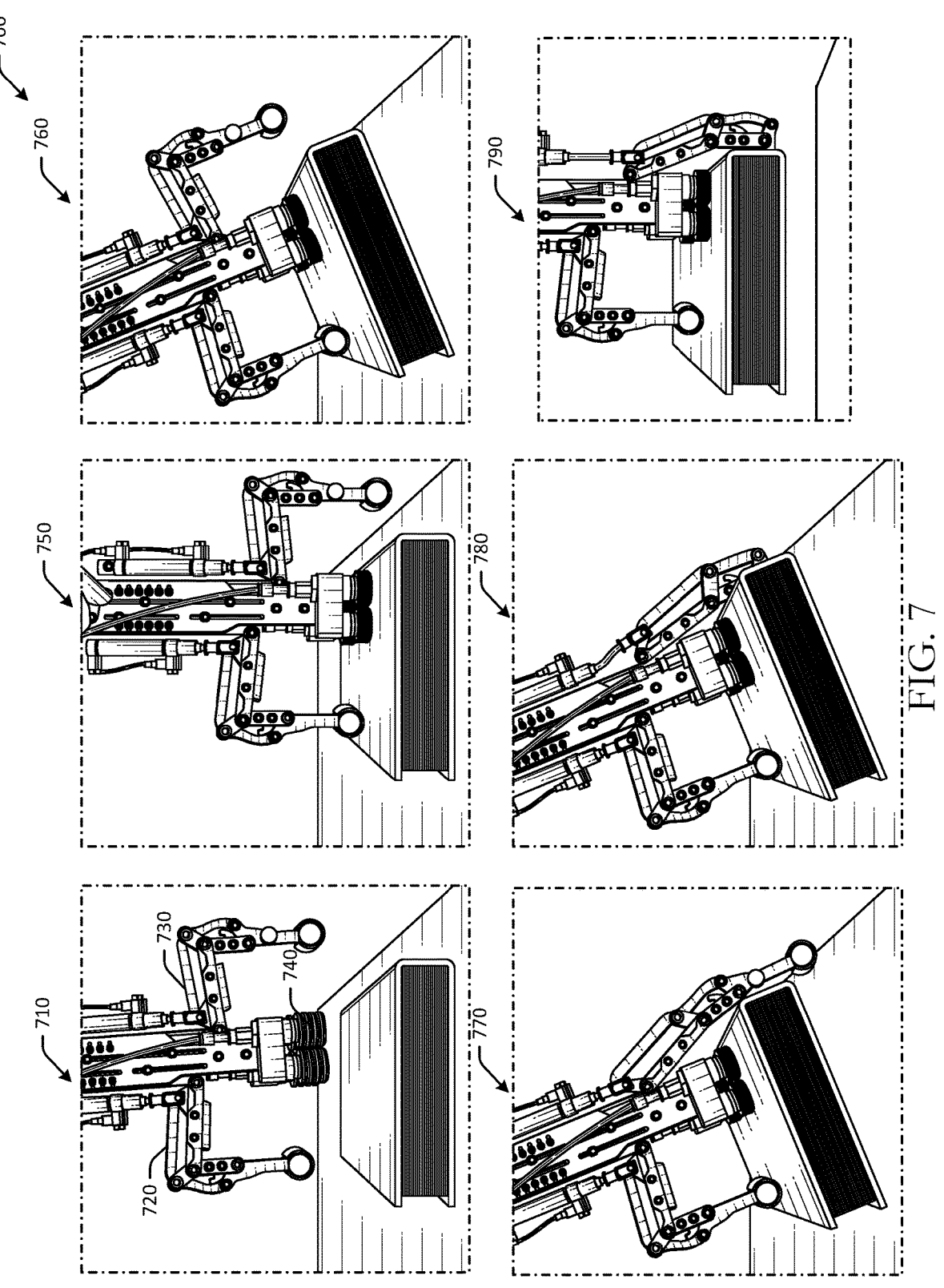
FIG. 7 is a schematic illustration of an item manipulation device grasping a book in various stages in accordance with one or more embodiments of the disclosure.

FIG. 7 is a schematic illustration of an item manipulation device 700 grasping a book in various stages in accordance with one or more embodiments of the disclosure. Other embodiments may include additional or fewer components. The illustrations of FIG. 7 are not to scale, and may not be illustrated to scale with respect to other figures. The end of arm tool illustrated in FIG. 7 may be the end of arm tool or item manipulation device discussed with respect to FIGS. 1A-6.

At a first instance 710, the item manipulation device 700 may include a first engagement member 720, a second engagement member 730, and one or more suction cups 740. The first engagement member 720 and the second engagement member 730 may be moved into an open position.

At a second instance 750, one or more of the suction cups 740 of the item manipulation device 700 may be moved into contact with the book. Suction may be activated at the suction cup. At a third instance 760, the book may be partially lifted (e.g., one side of the book may be lifted, etc.) while the first engagement member 720 is in contact with the upper surface of the book. At a fourth instance 770, the second engagement member 730 or clamping finger may be moved into position adjacent to a lower surface of the book. At a fifth instance 780, the book may be clamped with the second engagement member 730 by moving the second engagement member 730 into contact with the lower surface of the book. At a sixth instance 790, the book may be lifted by the item manipulation device 700 while the first engagement member 720 remains in contact with the upper surface and the second engagement member 730 remains in contact with the lower surface of the book. Suction may be optionally deactivated after the book is lifted. The first engagement member 720 and/or the second engagement member 730 may remain in fixed positions to support the book during lifting and/or movement.

Figure 8:
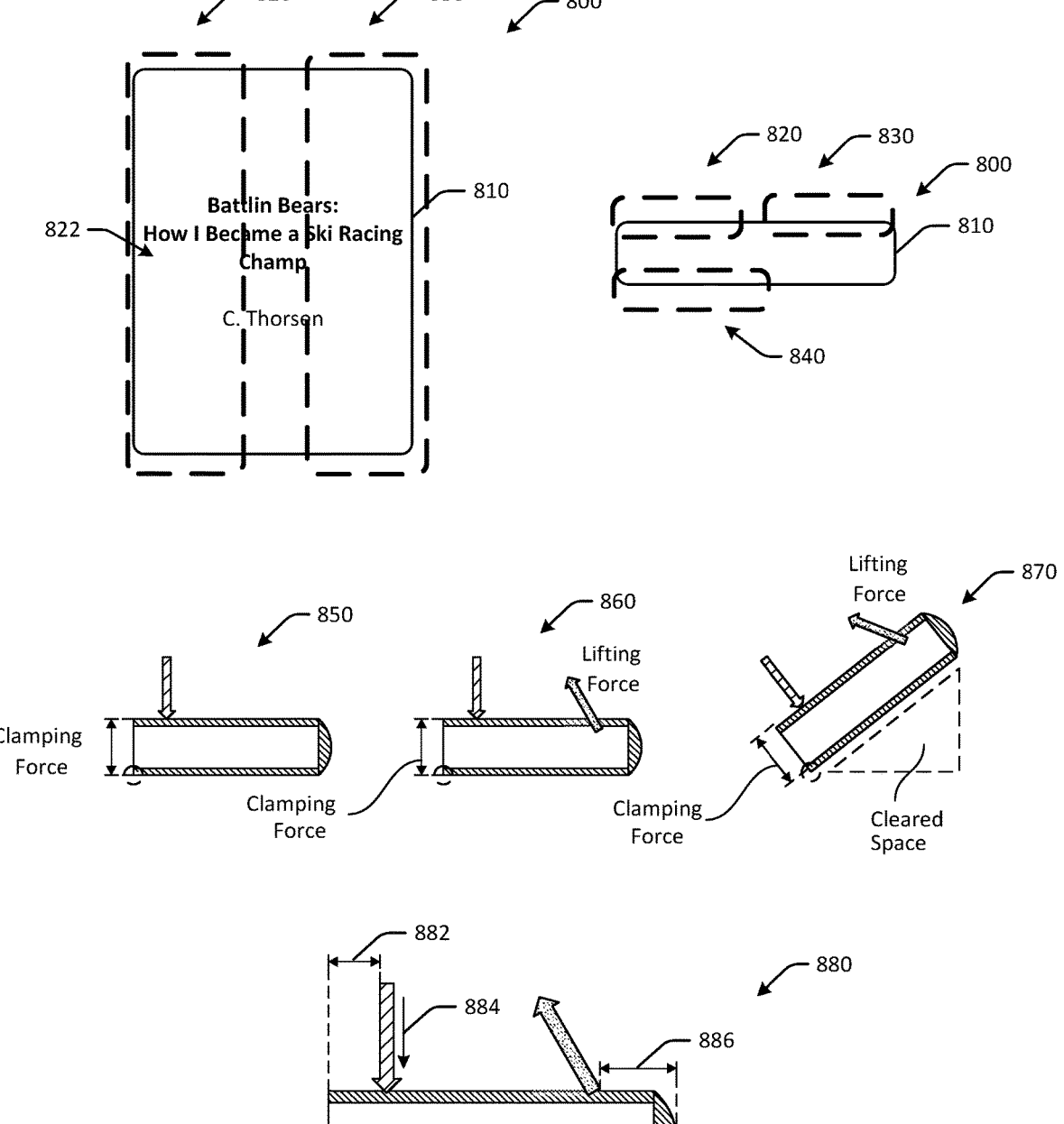
FIG. 8 is a schematic illustration of various contact and grasp points used by an item manipulation device to grasp an item in accordance with one or more embodiments of the disclosure.

FIG. 8 is a schematic illustration of various contact and grasp points 800 used by an item manipulation device to grasp an item in accordance with one or more embodiments of the disclosure. Other embodiments may include additional or fewer components. The illustrations of FIG. 8 are not to scale, and may not be illustrated to scale with respect to other figures. The end of arm tool discussed with respect to FIG. 8 may be the end of arm tool or item manipulation devices discussed with respect to FIGS. 1A-7.

In the example of FIG. 8, the item to be grasped may be a book 810. In a top view and side view, one or more sensors may be used to identify a first side 820 of the upper surface of the book 810, where the first side 820 may be a spine side. A second side 830 of the upper surface of the book 810 may be determined, where the second side 830 is on an opposite side of the upper surface relative to the first side 820. Similarly, a first side 840 of the lower surface may be determined, along with a second side, and so forth.

In some embodiments, a central portion 822 of the first side 820 and/or the second side 830 may be determined. The sides and/or central portion may be used as target suction cup locations and/or target contact locations for the end of arm tool.

In one example, the end of arm tool may be associated with a controller that may be configured to determine that the item is a book, determine a first side 820 of the book, where the first side 820 corresponds to a spine of the book, and determine a target suction cup location based at least in part on the first side 820. The target suction cup location may be anywhere along the first side 820, and may optionally be along the central portion 822. For example, the controller may determine a center portion of the first side 820 of the book, where the target suction cup location is based at least in part on the center portion.

At a first force schematic 850, the end of arm tool may be used to apply a clamping force to an upper surface of the book at a side opposite the spine. At a second force schematic 860, the lifting force may be applied via suction. At a third force schematic 870, the book may be partially lifted to clear a space underneath for an engagement member to contact a lower surface of the book. At a fourth force schematic 880, a clamping force 884 may be applied at a first distance 882 from the open end of the book (e.g., the non-spine side, etc.), while the lifting force can be applied a second distance 886 from the spine end of the book. The first distance 882 may be different than the second distance 886, or may be the same in some instances.

In some embodiments, to ensure that the force is applied to the bottom dust cover fold for books that have dust covers, the suction cup may be positioned as close as possible to the spine of the book and/or on the spine (e.g., second distance 886 close to or equal to zero, etc.). This prevents a pulling force on the top fold of the dust cover. By applying a downwards force on the book as close as possible to the opening side (e.g., first distance 882 close to or equal to zero, etc.), a greater clamping force is generated between the upper cover and the object where the book is laying on for the top fold of the dust cover. This clamping force ensures that the dust cover surrounding the book stays within the book, which allows the book to be picked up with vacuum and get tilted or partially lifted, as long as it maintains contact with the object on which the book rests. After the tilting, a space under the book is cleared, where something could be placed that can take over the role of the object where the book is pressed against, to maintain the clamping force.

One or more operations of the methods, process flows, or use cases of FIGS. 1A-8 may have been described above as being performed by an item manipulation device, or more specifically, by one or more program module(s), applications, or the like executing on a device. It should be appreciated, however, that any of the operations of the methods, process flows, or use cases of FIGS. 1A-8 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1A-8 may be described in the context of the illustrative devices, it should be appreciated that such operations may be implemented in connection with numerous other device configurations.

The operations described and depicted in the illustrative methods, process flows, and use cases of FIGS. 1A-8 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1A-8 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 9:
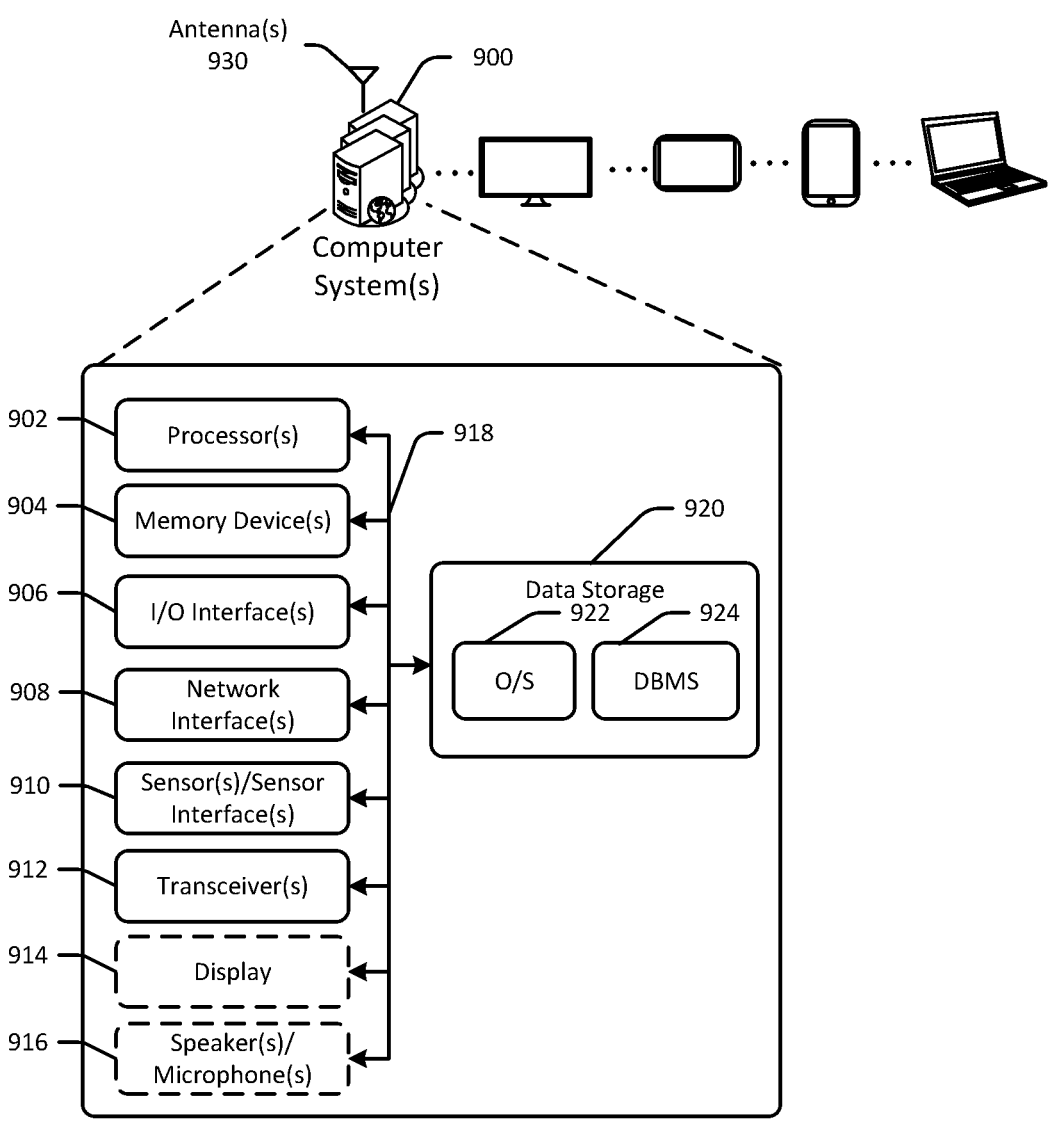
FIG. 9 schematically illustrates an example architecture of a computer system associated with an item manipulation device in accordance with one or more embodiments of the disclosure.

FIG. 9 is a schematic block diagram of one or more illustrative computer system(s) 900 in accordance with one or more example embodiments of the disclosure. The computer system(s) 900 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 900 may correspond to an illustrative device configuration for the device(s) of FIGS. 1A-8. For example, the computer system(s) 900 may control one or more aspects of the robotic manipulators and/or end of arm tools described in FIGS. 1A-8, such as determining whether items are grasped, determining end of arm tool positioning, determining when and what distance to extend engagement members, determine when and how long to actuate suction cups, and so forth.

The computer system(s) 900 may be configured to communicate with one or more servers, user devices, cameras, or the like. The computer system(s) 900 may be configured to identify items, retrieve items or containers, move items or containers, and so forth.

The computer system(s) 900 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 900 may include one or more processors (processor(s)) 902, one or more memory devices 904 (also referred to herein as memory 904), one or more input/output (I/O) interface(s) 906, one or more network interface(s) 908, one or more sensor(s) or sensor interface(s) 910, one or more transceiver(s) 912, one or more optional display(s) 914, one or more optional microphone(s) 916, and data storage 920. The computer system(s) 900 may further include one or more bus(es) 918 that functionally couple various components of the computer system(s) 900. The computer system(s) 900 may further include one or more antenna(s) 930 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 918 may include at least one of a system bus, a memory bus, an address bus, or a message bus, and may permit the exchange of information (e.g., data (including computer-executable code), signaling, etc.) between various components of the computer system(s) 900. The bus(es) 918 may include, without limitation, a memory bus or a memory controller, a peripheral bus, an accelerated graphics port, and so forth. The bus(es) 918 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 904 of the computer system(s) 900 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 904 may include multiple different types of memory such as various types of static random access memory (SRAM), various types of dynamic random access memory (DRAM), various types of unalterable ROM, and/or writeable variants of ROM such as electrically erasable programmable read-only memory (EE-PROM), flash memory, and so forth. The memory 904 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 920 may include removable storage and/or non-removable storage including, but not limited to, magnetic storage, optical disk storage, and/or tape storage. The data storage 920 may provide non-volatile storage of computer-executable instructions and other data. The memory 904 and the data storage 920, removable and/or non-removable, are examples of computer-readable storage media (CRSM) as that term is used herein.

The data storage 920 may store computer-executable code, instructions, or the like that may be loadable into the memory 904 and executable by the processor(s) 902 to cause the processor(s) 902 to perform or initiate various operations. The data storage 920 may additionally store data that may be copied to the memory 904 for use by the processor(s) 902 during the execution of the computer-executable instructions. Moreover, output data generated as a result of execution of the computer-executable instructions by the processor(s) 902 may be stored initially in the memory 904, and may ultimately be copied to the data storage 920 for non-volatile storage.

More specifically, the data storage 920 may store one or more operating systems (O/S) 922; one or more database management systems (DBMS) 924; and one or more program module(s), applications, engines, computer-executable code, scripts, or the like. Some or all of these module(s) may be sub-module(s). Any of the components depicted as being stored in the data storage 920 may include any combination of software, firmware, and/or hardware. The software and/or firmware may include computer-executable code, instructions, or the like that may be loaded into the memory 904 for execution by one or more of the processor(s) 902. Any of the components depicted as being stored in the data storage 920 may support functionality described in reference to corresponding components named earlier in this disclosure.

The data storage 920 may further store various types of data utilized by the components of the computer system(s) 900. Any data stored in the data storage 920 may be loaded into the memory 904 for use by the processor(s) 902 in executing computer-executable code. In addition, any data depicted as being stored in the data storage 920 may potentially be stored in one or more datastore(s) and may be accessed via the DBMS 924 and loaded in the memory 904 for use by the processor(s) 902 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 902 may be configured to access the memory 904 and execute the computer-executable instructions loaded therein. For example, the processor(s) 902 may be configured to execute the computer-executable instructions of the various program module(s), applications, engines, or the like of the computer system(s) 900 to cause or facilitate various operations to be performed in accordance with one or more embodiments of the disclosure. The processor(s) 902 may include any suitable processing unit capable of accepting data as input, processing the input data in accordance with stored computer-executable instructions, and generating output data. The processor(s) 902 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 902 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 902 may be capable of supporting any of a variety of instruction sets.

Referring now to other illustrative components depicted as being stored in the data storage 920, the O/S 922 may be loaded from the data storage 920 into the memory 904 and may provide an interface between other application software executing on the computer system(s) 900 and the hardware resources of the computer system(s) 900. More specifically, the O/S 922 may include a set of computer-executable instructions for managing the hardware resources of the computer system(s) 900 and for providing common services to other application programs (e.g., managing memory allocation among various application programs). In certain example embodiments, the O/S 922 may control execution of the other program module(s). The O/S 922 may include any operating system now known or which may be developed in the future including, but not limited to, any server operating system, any mainframe operating system, or any other proprietary or non-proprietary operating system.

The DBMS 924 may be loaded into the memory 904 and may support functionality for accessing, retrieving, storing, and/or manipulating data stored in the memory 904 and/or data stored in the data storage 920. The DBMS 924 may use any of a variety of database models (e.g., relational model, object model, etc.) and may support any of a variety of query languages. The DBMS 924 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 900 is a mobile device, the DBMS

924 may be any suitable lightweight DBMS optimized for performance on a mobile device.

Referring now to other illustrative components of the computer system(s) 900, the input/output (I/O) interface(s) 906 may facilitate the receipt of input information by the computer system(s) 900 from one or more I/O devices as well as the output of information from the computer system(s) 900 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 900 or may be separate. The I/O devices may further include, for example, any number of peripheral devices such as data storage devices, printing devices, and so forth.

The I/O interface(s) 906 may also include an interface for an external peripheral device connection such as universal serial bus (USB), Fire Wire, Thunderbolt, Ethernet port or other connection protocol that may connect to one or more networks. The I/O interface(s) 906 may also include a connection to one or more of the antenna(s) 930 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 900 may further include one or more network interface(s) 908 via which the computer system(s) 900 may communicate with any of a variety of other systems, platforms, networks, devices, and so forth. The network interface(s) 908 may enable communication, for example, with one or more wireless routers, one or more host servers, one or more web servers, and the like via one or more networks.

The antenna(s) 930 may include any suitable type of antenna depending, for example, on the communications protocols used to transmit or receive signals via the antenna(s) 930. Non-limiting examples of suitable antennas may include directional antennas, non-directional antennas, dipole antennas, folded dipole antennas, patch antennas, multiple-input multiple-output (MIMO) antennas, or the like. The antenna(s) 930 may be communicatively coupled to one or more transceivers 912 or radio components to which or from which signals may be transmitted or received.

As previously described, the antenna(s) 930 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 930 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g. 802.11n), 5 GHz channels (e.g., 802.11n, 802.11ac), or 60 GHz channels (e.g., 802.11ad). In alternative example embodiments, the antenna(s) 930 may be configured to transmit or receive radio frequency signals within any suitable frequency range forming part of the unlicensed portion of the radio spectrum.

The antenna(s) 930 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 912 may include any suitable radio component(s) for—in cooperation with the antenna(s) 930—transmitting or receiving radio frequency (RF) signals in the bandwidth and/or channels corresponding to the communications protocols utilized by the computer system(s) 900 to communicate with other devices. The transceiver(s) 912 may include hardware, software, and/or firmware for modulating, transmitting, or receiving—potentially in cooperation with any of antenna(s) 930—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 912 may further include hardware, firmware, or software for receiving GNSS signals. The transceiver(s) 912 may include any known receiver and baseband suitable for communicating via the communications protocols utilized by the computer system(s) 900. The transceiver(s) 912 may further include a low noise amplifier (LNA), additional signal amplifiers, an analog-to-digital (A/D) converter, one or more buffers, a digital baseband, or the like.

The sensor(s)/sensor interface(s) 910 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 914 may be configured to output light and/or render content. The optional speaker(s)/microphone(s) 916 may be any device configured to receive analog sound input or voice data.

It should be appreciated that the program module(s), applications, computer-executable instructions, code, or the like depicted in FIG. 9 as being stored in the data storage 920 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 900, and/or hosted on other computing device(s) accessible via one or more networks, may be provided to support functionality provided by the program module(s), applications, or computer-executable code depicted in FIG. 9 and/or additional or alternate functionality. Further, functionality may be modularized differently such that processing described as being supported collectively by the collection of program module(s) depicted in FIG. 9 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 9 may be implemented, at least partially, in hardware and/or firmware across any number of devices.

It should further be appreciated that the computer system(s) 900 may include alternate and/or additional hardware, software, or firmware components beyond those described or depicted without departing from the scope of the disclosure. More particularly, it should be appreciated that software, firmware, or hardware components depicted as forming part of the computer system(s) 900 are merely illustrative and that some components may not be present or additional components may be provided in various embodiments. While various illustrative program module(s) have been depicted and described as software module(s) stored in the data storage 920, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A system comprising:
a robotic manipulator; and
an item manipulation device coupled to the robotic manipulator, the item manipulation device comprising:
  a housing;
  a suction cup assembly comprising a first suction cup, wherein the suction cup assembly is positioned at a distal end of the housing;
  a first engagement member comprising a first arm portion configured to rotate with respect to the housing;
  a first belt coupled to the first arm portion;
  a second engagement member comprising a second arm portion configured to rotate with respect to the housing, wherein the first engagement member is positioned at a different vertical position along the housing than the second engagement member; and
  a first actuator configured to actuate the first belt to cause the first arm portion to rotate with respect to the housing.

2. The system of claim 1, wherein the first engagement member further comprises:
a second arm portion configured to rotate with respect to the first arm portion;
a second belt coupled to the first arm portion and the second arm portion, wherein rotation of the second belt causes the second arm portion to rotate with respect to the first arm portion;
a third arm portion configured to rotate with respect to the second arm portion, wherein the third arm portion is coupled to the second arm portion via a one-way bearing; and
a third belt coupled to the second arm portion and the third arm portion, wherein rotation of the third belt causes the third arm portion to rotate with respect to the second arm portion.

3. The system of claim 2, wherein the item manipulation device further comprises:
a second actuator configured to actuate the second belt; and
a third actuator configured to actuate the third belt;
wherein the first actuator, the second actuator, and the third actuator are disposed at an upper end of the housing.

4. The system of claim 1, wherein the first engagement member further comprises:

an external belt disposed along an outer surface of the first engagement member, the external belt coupled to both the first engagement member and the second engagement member.

5. An item manipulation device comprising:

a housing;

a suction cup assembly comprising a first suction cup, wherein the suction cup assembly is positioned at a distal end of the housing;

a first engagement member comprising a first arm portion configured to rotate with respect to the housing;

a second engagement member comprising a second arm portion configured to rotate with respect to the housing, wherein the first engagement member is positioned at a different vertical position along the housing than the second engagement member;

a first belt coupled to the first arm portion; and a first actuator configured to actuate the first belt to cause the first arm portion to rotate with respect to the housing.

6. The item manipulation device of claim 5, wherein the first engagement member further comprises:

a second arm portion configured to rotate with respect to the first arm portion; and a second belt coupled to the first arm portion and the second arm portion, wherein rotation of the second belt causes the second arm portion to rotate with respect to the first arm portion.

7. The item manipulation device of claim 6, wherein the first engagement member further comprises:

a third arm portion configured to rotate with respect to the second arm portion; and a third belt coupled to the second arm portion and the third arm portion, wherein rotation of the third belt causes the third arm portion to rotate with respect to the second arm portion.

8. The item manipulation device of claim 7, further comprising:

a second actuator configured to actuate the second belt; and a third actuator configured to actuate the third belt.

9. The item manipulation device of claim 8, wherein the third arm portion is coupled to the second arm portion via a one-way bearing, wherein the first actuator is disposed at a proximal end of the housing, and wherein the second actuator and the third actuator are disposed adjacent to the second arm portion and the third arm portion, respectively.

10. The item manipulation device of claim 7, wherein the first arm portion and the second arm portion are substantially axially aligned, and the third arm portion is disposed at an acute angle relative to the second arm portion when the first engagement member is in a stored position.

11. The item manipulation device of claim 5, further comprising:

wherein the first engagement member is disposed at a first side of the housing, and the second engagement member is disposed at a second side of the housing.

12. The item manipulation device of claim 11, wherein the first engagement member further comprises:

an external belt disposed along an outer surface of the first engagement member, the external belt coupled to both the first engagement member and the second engagement member.

13. The item manipulation device of claim 5, wherein the suction cup assembly further comprises a second suction cup.

14. The item manipulation device of claim 5, wherein the first engagement member is devoid of a suction cup.

15. An end of arm tool for an item manipulation device, the end of arm tool comprising:

a housing;

a suction cup assembly comprising a first suction cup, wherein the suction cup assembly is positioned at a distal end of the housing;

a first engagement member comprising a first arm portion configured to rotate with respect to the housing;

a first belt coupled to the first arm portion;

a second engagement member comprising a second arm portion configured to rotate with respect to the housing, wherein the first engagement member is positioned at a different vertical position along the housing than the second engagement member; and a first actuator configured to actuate the first belt to cause the first arm portion to rotate with respect to the housing.

16. The end of arm tool of claim 15, wherein the first engagement member further comprises:

a second arm portion configured to rotate with respect to the first arm portion; and a second belt coupled to the first arm portion and the second arm portion, wherein rotation of the second belt causes the second arm portion to rotate with respect to the first arm portion.

17. The end of arm tool of claim 16, wherein the first engagement member further comprises:

a third arm portion configured to rotate with respect to the second arm portion; and a third belt coupled to the second arm portion and the third arm portion, wherein rotation of the third belt causes the third arm portion to rotate with respect to the second arm portion, and wherein the third arm portion is coupled to the second arm portion via a one-way bearing.

18. The end of arm tool of claim 17, wherein the first arm portion and the second arm portion are substantially axially aligned, and the third arm portion is disposed at an acute angle relative to the second arm portion when the first engagement member is in a stored position.

19. The end of arm tool of claim 15, wherein the first engagement member further comprises:

an external belt disposed along an outer surface of the first engagement member, the external belt coupled to both the first engagement member and the second engagement member.

* * * * *